May 1, 1934.  E. W. GEMMER  1,956,918
PLANTING TOOL
Filed July 31, 1933
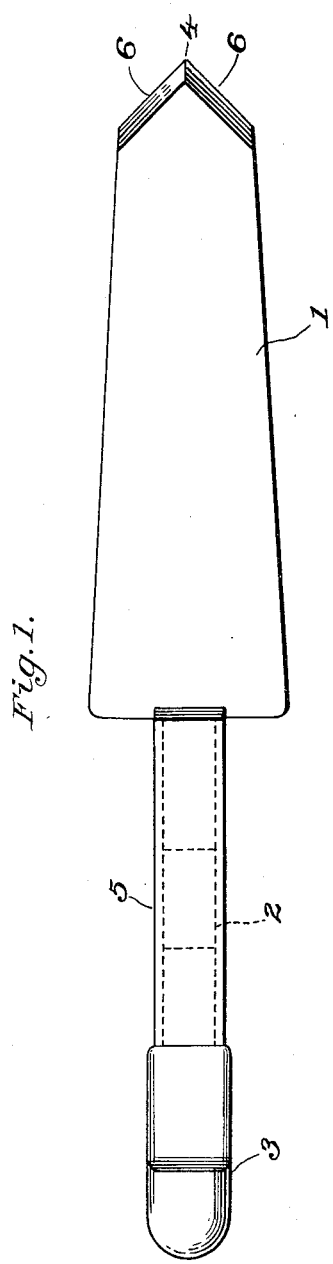
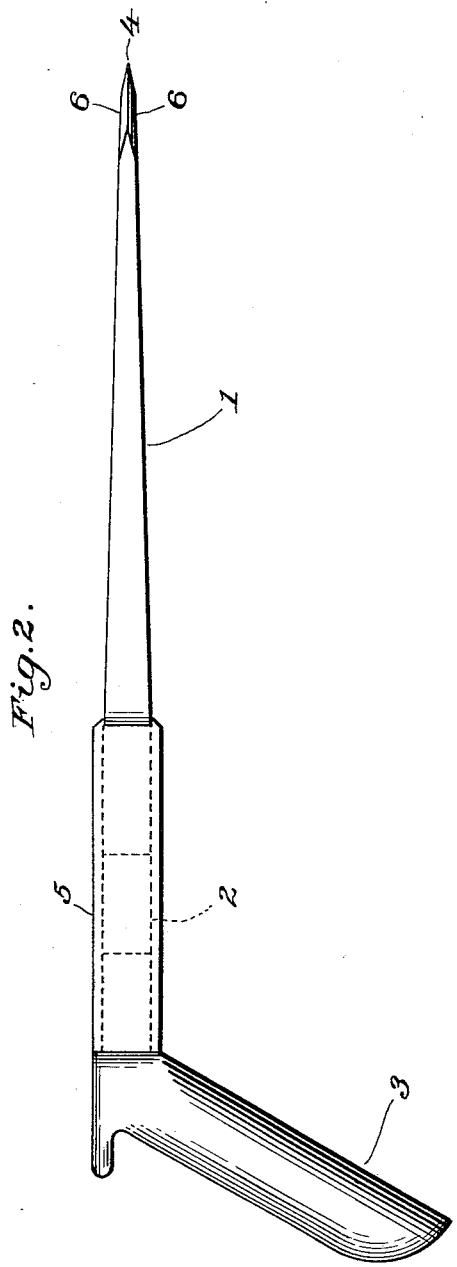
Inventor:
Eugene W. Gemmer
By
Attorneys Patented May 1, 1934

1,956,918

UNITED STATES PATENT OFFICE 1,956,918

PLANTING TOOL

Eugene W. Gemmer, New Orleans, La., dedicated to the free use of the Public

Application July 31, 1933, Serial No. 683,010

5 Claims. (Cl. 55—67)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without payment to me of any royalty thereon.

I hereby dedicate the invention herein described to the free use of the public in the territory of the United States of America to take effect upon the granting of a patent to me.

My invention relates to a tree planting tool designed for use by one individual.

The one-man planting crew has been used extensively in the Lake States of the United States and on the western forests, but has received little recognition in the East or South. In the South a crew of two men—one man using a heavy planting bar, the other doing the actual planting—has been the most common practice. This method when used in the areas of dense scrub oak on cut-over pine lands in the Choctawhatchee National Forst in northwestern Florida was found to be unsatisfactory. Because of the density of the brush, the men got in each other's way, and were further handicapped by being unable to make a full arm stroke of the planting iron. The presence of numerous woody roots often necessitated making new holes, or if roots were severed they sprang back into the hole upon the removal of the planting bar. Mattock slit planting was handicapped in the same way and in addition the sandy nature of the soil prevented the making of a clean, deep slit. To meet the conditions encountered the one man planting tool hereinafter described was devised. Such a tool should be adapted to easy transportation and use in the field; make a clean hole in the soil; slide around the larger roots; and, slice through the smaller roots without pulling them into the hole.

I attain these objects by the device illustrated in the accompanying drawing in which—

Figure 1 is a top plan view of the device and Figure 2 is a side elevation thereof.

As manufactured by me the planting tool is of all-steel construction having a length of eighteen and one-quarter inches, and consists of a tapered sharpened and pointed blade 1 ten inches long, two to three inches wide and three-quarters of an inch thick with a stock 2 five inches long and a rigidly attached pistol grip shaped handle 3. The sharpened point 4 of the blade 1 is of tempered steel. The solid metal handle 3 is made of rod steel, desirable for strength and helps to give proper balance and weight to the entire tool.

The blade 1 is wedge shaped throughout, both as to width and thickness and its smaller or free end is brought to a point 4 by abruptly converging lines or edges 6 starting near the end of the blade. That is to say, these edges start at a point short of the smaller end of the blade and run diagonally to a point at the middle of the blade end. These converging lines or edges are sharpened to a cutting edge. The width and thickness of the blade is calculated to make a hole large enough to accommodate the roots of any size of forest planting stock now in use. The length of the blade and stock makes it possible to open a hole up to fifteen inches in depth, if desired.

The handle end of the blade member is shaped into a shank or stock 2 around which is placed a rigidly secured connecting sleeve 5 approximately five inches long as used by me. To the free or handle end of this sleeve is rigidly attached the pistol grip shaped handle 3 which facilitates the operation of the tool. The connecting sleeve 5 encircles the shank 2 between the blade 1 and the pistol grip handle 3 and is made of one inch steel tubing.

The point on the blade is essential in soil where large masses of woody roots occur. The sharpened edges slice through the smaller roots without pulling them into the hole and ride off the larger roots where a square edged blade would hang-up. This deflecting process saves from 25 to 50 per cent of the planting time on some situations. The combination of point, tapered flat blade, weight and pistol grip handle makes up a real improvement over the tools now generally in use.

During January 1933, over a thousand seedlings were planted with this tool on the Choctawhatchee National Forest. These seedlings included long-leaf pine and a large variety of exotic conifers, and many conditions of root structure, size, and length were dealt with in planting. The performance was highly successful. The rate of planting was close to 500 trees for an eight hour day, where previously 750 trees was the limit for a two-man crew with the large planting bar. The slit hole was made by thrusting the blade into the soil from a height of 18 inches. The thrust can be modified into a distinct throwing motion with practice. The weight of the tool and the shape of the blade resulted in clean holes easily made and easily closed. Everything considered, this method was less tiring than the previous one used. In most cases one or two thrusts were sufficient to make a hole 10 to 12 inches deep. Where hardpan was encountered at a depth of nine inches an extra blow obtained the additional two or three inches needed.

After this tool had demonstrated its usefulness on the light sandy soils for which it was designed, tests of it were made on heavier soils at Bogalusa, Louisiana. Here again it proved surprisingly successful in opening holes at a speed of at least twice that obtained on the Choctawhatchee Forest.

Having fully disclosed my discovery I claim as my invention:

1. A planting tool comprising a pointed wedge-shaped blade having two sharpened cutting edges adjacent the point of said blade, all other edges being blunt, a pistol grip shaped handle and means to rigidly secure said blade to the handle.

2. A planting tool comprising a tapered flat surfaced blade having a point at its smaller end with two sharpened cutting edges adjacent said point, all other edges being blunt and a handle formed integral with the other end of the blade.

3. A planting tool comprising a pointed tapering blade, said blade being brought to a point by two abruptly converging diagonal edges starting near the small end of said blade, said diagonal edges being sharpened to a cutting edge, all other edges being blunt, a shank formed integral with the other end of the blade and a pistol grip shaped handle rigidly secured to said shank.

4. A planting tool comprising a flat surfaced wedge-shaped blade having a point at its smaller end, each surface of the blade being tapered and having two abruptly converging diagonal cutting edges adjacent said point, all other edges being blunt, a stock formed integral at one end with the other end of the blade and a pistol grip shaped handle rigidly attached to the other end of the stock.

5. In a planting tool, a wedge-shaped blade having a point at its smaller end and two abruptly diagonal converging cutting edges adjacent said point, all other edges being blunt.

EUGENE W. GEMMER.